(12) United States Patent
Marlin

(10) Patent No.: US 8,043,392 B2
(45) Date of Patent: Oct. 25, 2011

(54) MIXTURE OF MOLTEN ALUMINA-ZIRCONIA GRAINS

(75) Inventor: Samuel Marlin, Plan d'Orgon (FR)

(73) Assignee: Saint Gobain Centre de Recherches et d'Etudes European, Courbevoie (FR)

( * ) Notice: Subject to any disclaimer, the term of this patent is extended or adjusted under 35 U.S.C. 154(b) by 976 days.

(21) Appl. No.: 11/630,508

(22) PCT Filed: Jun. 23, 2005

(86) PCT No.: PCT/FR2005/001587
§ 371 (c)(1),
(2), (4) Date: Oct. 22, 2007

(87) PCT Pub. No.: WO2006/010823
PCT Pub. Date: Feb. 2, 2006

(65) Prior Publication Data
US 2008/0028685 A1   Feb. 7, 2008

(30) Foreign Application Priority Data

Jun. 24, 2004  (FR) .................................. 04 06919

(51) Int. Cl.
| | |
|---|---|
| *B24D 3/00* | (2006.01) |
| *B24D 11/00* | (2006.01) |
| *B24D 18/00* | (2006.01) |
| *B24D 3/02* | (2006.01) |
| *C09K 3/14* | (2006.01) |
| *C09C 1/68* | (2006.01) |

(52) U.S. Cl. ............................... 51/307; 51/293; 51/309
(58) Field of Classification Search ............... 51/307, 51/293, 309
See application file for complete search history.

(56) References Cited

U.S. PATENT DOCUMENTS

| | | | | |
|---|---|---|---|---|
| 3,181,939 | A |  | 5/1965 | Marshall et al. |
| 3,891,408 | A | * | 6/1975 | Rowse et al. ................ 51/295 |
| 3,993,119 | A |  | 11/1976 | Scott |
| 4,035,162 | A |  | 7/1977 | Brothers et al. |
| 4,126,429 | A | * | 11/1978 | Watson ......................... 51/309 |
| 4,457,767 | A | * | 7/1984 | Poon et al. ..................... 51/298 |
| 5,525,135 | A | * | 6/1996 | Moltgen et al. ................ 51/309 |
| 5,567,214 | A | * | 10/1996 | Ashley .......................... 51/309 |
| 2004/0040218 | A1 | * | 3/2004 | Aleonard et al. ............ 51/309 |

FOREIGN PATENT DOCUMENTS

WO    WO 00/34201    6/2000

* cited by examiner

*Primary Examiner* — James McDonough
(74) *Attorney, Agent, or Firm* — Young & Thompson

(57) ABSTRACT

The mixture of molten alumina-zircon grains has the following chemical composition in percentage by weight to give 100%: 40-45.5% $ZrO+HfO_2$; 46-58% $Al_2O_3$; 0-10% additive; <0.8% $SiO_2$ and <1,2% impurities. The mixture is characterised in that the degree of impurity-containing grains is less than 2% and the nodule concentration measured on the section of any grain of the mixture is greater than 500 nodules per $mm^2$ in at least 50% of cases.

15 Claims, 2 Drawing Sheets

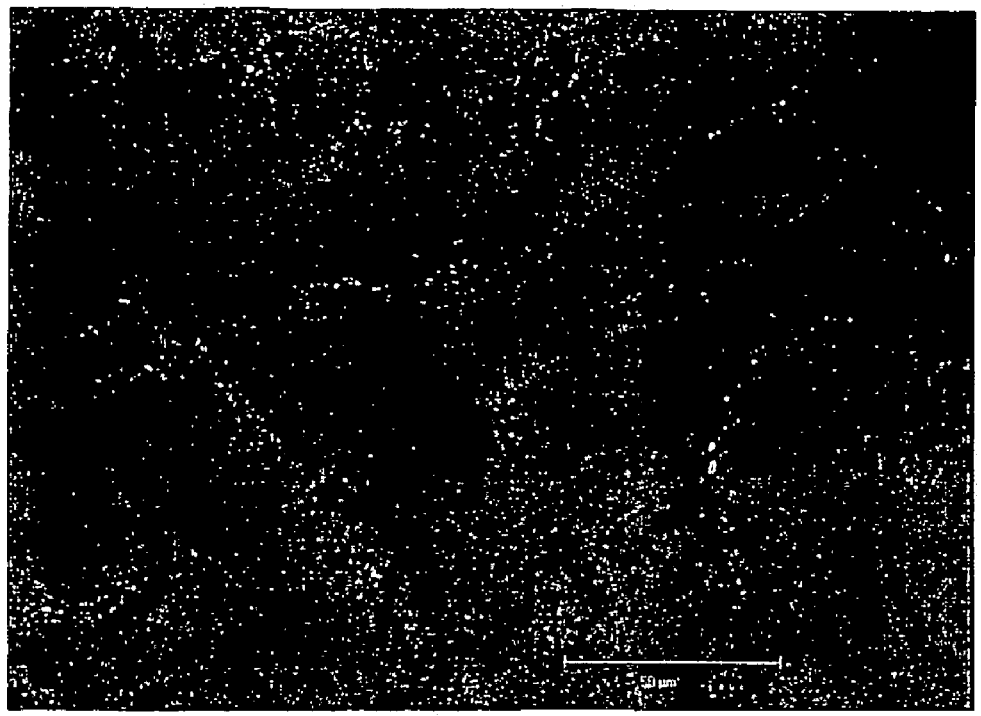
Fig. 1  ←50 μm→
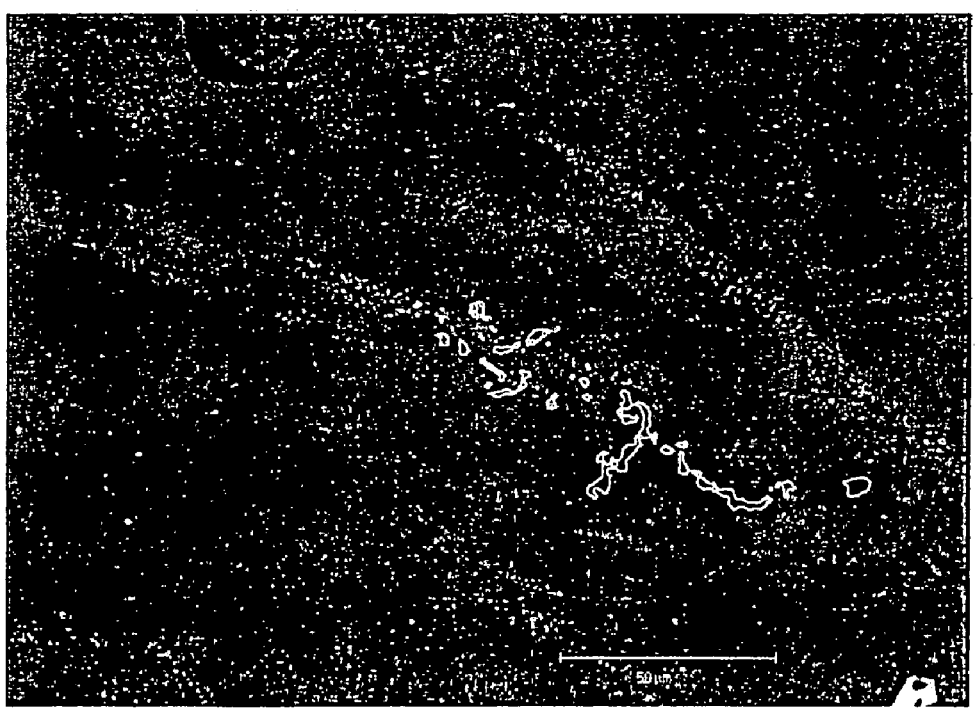
Fig. 2  ←50 μm→

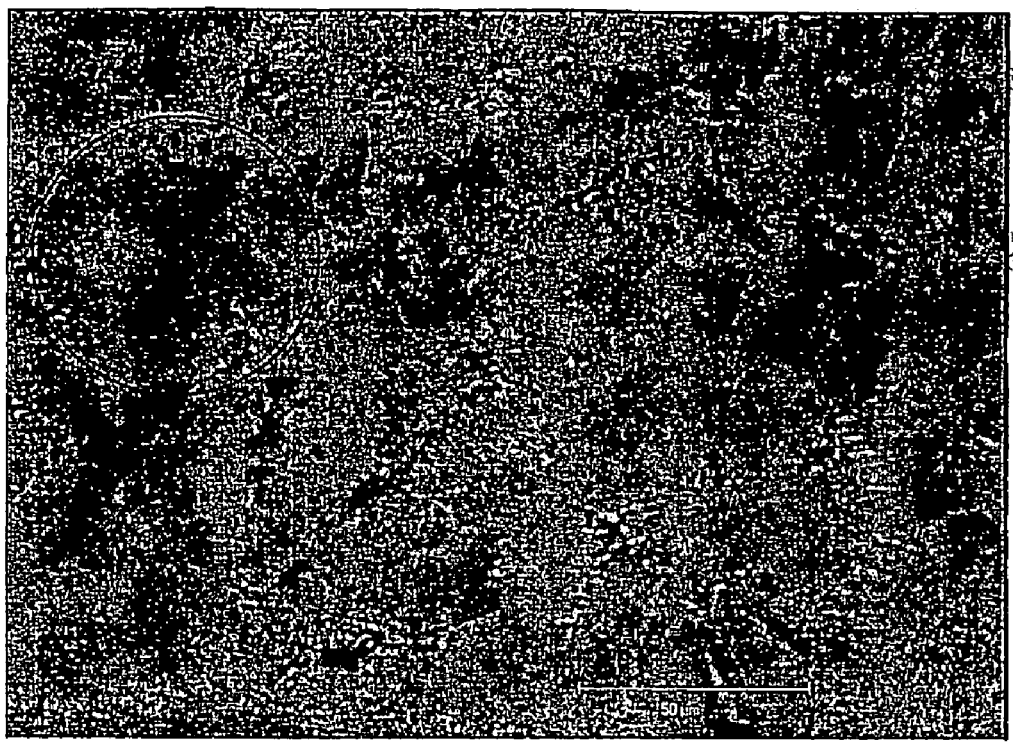
Fig. 3  ←50 µm→
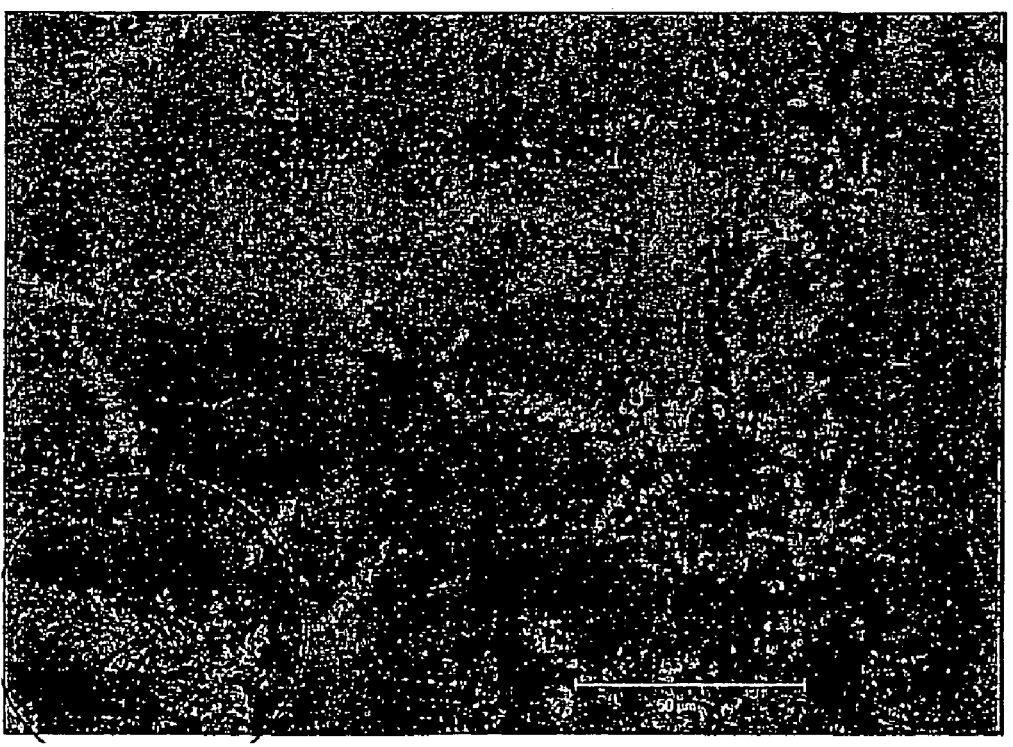
Fig. 4  ←50 µm→

MIXTURE OF MOLTEN ALUMINA-ZIRCONIA GRAINS

The present invention relates to a mixture of fused ceramic grains essentially consisting of alumina and zirconia in proportions close to the binary eutectic (42% zirconia by weight) and having improved abrasive performance. The invention also relates to an abrasive tool comprising a mixture of grains according to the invention and to a process for manufacturing a mixture of grains according to the invention.

Abrasive tools are generally classified according to the method in which the ceramic grains constituting them are formed: free abrasives (used in spraying or in suspension, without a support); coated abrasives (on a support of the fabric or paper type, in which the grains are placed on several layers); and bonded abrasives (in the form of circular grinding wheels, sticks, etc.). In the latter cases, the abrasive grains are pressed with an organic or glassy binder (in this case, a binder consisting of essentially silicated oxides). These grains must themselves have good abrasion mechanical properties (especially toughness) and provide good mechanical cohesion with the binder (strength of the interface). At the present time, there are various families of abrasive grains that allow a wide range of applications and performance to be covered: melt-synthesized oxide grains in particular offer an excellent quality/manufacturing cost compromise.

In the present description, unless otherwise indicated, all the compositions of a grain are given as percentages by weight, on the basis of the total weight of the grain.

Within the range of fused grains, materials based on alumina and zirconia are known from U.S. Pat. No. 3,181,939.

These grains are generally composed of 10 to 60% zirconia with 0 to 10% of an additive, the balance being alumina. In practice, the zirconia content of commercial products lies either at around 25%, or around the value of the alumina/zirconia eutectic located at about 42% zirconia, generally from 35 to 50%, as described in patent U.S. Pat. No. 3,891,408. This patent indicates that the products around the eutectic have a better performance at application than aluminous grains, most particularly if they have been solidified very rapidly, so that, in the eutectic colonies, the interlamella or inter-fiber spaces are less than 4000 Å (with eutectic colonies oriented perpendicular to the solidification front). This unique type of structure provides an excellent compromise between the mechanical strength required for maximum duration of use of the grit and microfracturing necessary for good regeneration of the cut surfaces.

As additives, yttrium oxide is known, added up to 2% according to U.S. Pat. No. 4,457,767, or titanium oxide, added up to 10% according to patent DE-C1-4306966. These additives improve the abrasive power of the alumina/zirconia grains. Magnesium oxide is also a possible additive, but above a content of a few points, its presence leads to the formation of a spinel with alumina until disappearance of the corundum, hence a poor mechanical performance.

By way of example of grains described in U.S. Pat. No. 4,457,767, mention may be made of the grains sold by Saint-Gobain (France) under the name NZPlus®. Typically, these grains contain 39% by weight of zirconia and 0.8% of $Y_2O_3$, less than 0.5% impurities and the balance being alumina. Mixtures of these grains are widely used for coated abrasives or for abrasive grinding wheels with an organic binder in operations having a high rate of removal of material (roughing, skiving, etc.), in particular on stainless steel.

Also known, from FR 2 787 106, are grains having a $ZrO_2+HfO_2$ content between 10 and 60% and an $Al_2O_3$ content between 38 and 90%. These fused alumina/zirconia grains are manufactured by melting raw materials (of variable purity) in a reducing atmosphere (especially with the addition of a source of carbon—petroleum coke, pitch or coal—in the furnace). The molten material is then cooled, preferably rapidly, in order to favor the formation of fine oriented structures, for example by means of a device for cooling the liquid between thin metal plates, as presented in patent U.S. Pat. No. 3,993,119. The cooled material is finally milled, for example by means of roll mills, and then screened and classified as series of grit size distributions, or grits, meeting precise standards (for example the FEPA standard). The grains thus manufactured are compact and little reduced. They have good mechanical properties and advantageously can be used in grinding wheels with a glassy binder.

However, under certain low-pressure grinding conditions on stainless steel or more generally on a high-carbon steel of high hardness, the grains of the prior art exhibit inferior abrasive performance, and especially premature wear by attrition on carbon steels.

There is therefore a need for a mixture of fused alumina/zirconia abrasive grains having improved abrasive properties. The object of the invention is to meet this need.

According to the invention, this objective is achieved by means of a mixture of fused alumina/zirconia grains having the following chemical composition, in percentages by weight:

| | |
|---|---|
| $ZrO_2 + HfO_2$: | 40-45.5% |
| $Al_2O_3$: | 46-58% |
| Additive: | 0-10% |
| $SiO_2$: | <0.8% |
| Impurities: | <1.2%. |

This mixture of grains is noteworthy in that it has a content of grains containing inclusions of less than 2% and in that the nodule concentration measured on a cross section of any grain of said mixture is greater than 500 nodules per $mm^2$ in at least 50%, preferably 80% and more preferably 90% of the grains observed.

Hitherto, the properties of the mixtures of grains have been improved in particular by modifying the chemical composition of these grains, for example by choosing it to be close to the zirconia/alumina eutectic (U.S. Pat. No. 3,891,408), by adding zirconia stabilizers or other compounds, as described in U.S. Pat. No. 4,035,162, EP 595 081 or U.S. Pat. No. 4,126,429, or by modifying the impurity contents in the raw materials (U.S. Pat. No. 5,567,214) or the residual carbon content in the grains, representative of the oxidation-reduction state. The composition of the grain according to the invention is also known, for example from FR 2 787 106.

For the first time, the inventors have observed that the abrasive properties of the fused alumina/zirconia grains are dependent on the content of grains of the mixture containing inclusions and on the quantity of nodules in the grains. In particular, a nodule concentration between 600 and 3500 nodules per $mm^2$ proves to be advantageous for improving the abrasive properties of the grains, provided that the content of grains of the mixture containing inclusions remains below 2%.

Preferably, the mixture of grains according to the invention also has the following features:
said nodule concentration is greater than 600 nodules per $mm^2$, preferably greater than 900 nodules per $mm^2$;
said nodule concentration is less than 2500 nodules per $mm^2$, preferably less than 2000 nodules per $mm^2$, more preferably less than 1500 nodules per $mm^2$;

said mixture has a content of grains containing inclusions of at most 1.5%;
said additive is chosen from the group formed by yttrium oxide, titanium oxide, magnesium and calcium oxides, neodymium, lanthanum, cerium, dysprosium and erbium oxides, and any other compound of the family of rare earths, or a mixture thereof;
in percentages by weight:

| | |
|---|---|
| $Y_2O_3$: | 0.1-1.2% and/or |
| $TiO_2$: | 0.1-3% and/or |
| $SiO_2$: | <0.4% and/or |
| $ZrO_2 + HfO_2$: | 42-44%; | the content of grains containing primary zirconia is between 20 and 45%;
the content of grains containing primary corundum is between 0 and 20%;
the subassembly formed by the grains of said mixture having a size between 500 and 600 µm has a content of grains containing inclusions of less than 2%, preferably 1.5%, and/or a content of grains containing primary zirconia between 20 and 45% and/or a content of grains containing primary corundum between 0 and 20%;
preferably, the grains of the mixture according to the invention have a size between grit 12 and grit 220, more preferably between grit 16 and grit 80. The abrasive performance is thereby improved.

The invention also relates to an abrasive tool comprising a mixture of abrasive grains bonded by a binder or deposited as a layer on a flexible support and retained by a binder, noteworthy in that said mixture is in accordance with the invention.

Finally, the invention relates to a process for manufacturing a mixture of grains according to the invention, comprising the following successive steps:
a) mixing of raw materials;
b) melting of said mixed raw materials until a molten liquid is obtained;
c) cooling of said molten liquid by quenching it, preferably so that the fused liquid is entirely solidified in less than three minutes, until a solid mass is obtained; and
d) milling of said solid mass so as to obtain a mixture of grains and, optionally, grit size classification of said mixture,
said raw materials being chosen so that the grains of said mixture have a chemical composition in accordance with that of the grains of a mixture according to the invention.

This process is noteworthy in that it includes a selection final step so as to obtain a mixture of grains according to the invention.

Preferably, after the milling step, grains having, according to the FEPA standard, a size between grit 12 and grit 220, more preferably between grit 16 and grit 80, are selected.

Other features and advantages of the present invention will become apparent on reading the following description and on examining the appended drawing in which FIGS. 1, 2, 3 and 4 represent photographs of the surface of a grain of a mixture according to the invention, where nodules, an inclusion, a primary corundum crystal and a primary zirconia dendrite, have been surrounded, respectively.

The oxide contents of the grains of the mixture according to the invention relate to the overall contents for each of the corresponding chemical elements, expressed in the form of the most stable oxide, according to the standard convention in the industry. Therefore included are suboxides and optionally nitrides, oxynitrides, carbides, oxycarbides and carbonitrides, or even metallic species of the abovementioned elements.

All the other compounds are considered as "impurities", in particular compounds forming part of the group of oxides, nitrides, oxynitrides, carbides, oxycarbides, carbonitrides and metallic species of sodium and other alkaline metals, iron, silicon, vanadium and chromium. Hafnium oxide, naturally present in the zirconia sources with a content of less than 2%, is not considered as an impurity. The residual carbon, expressed as C, forms part of the impurities of the composition of the grains of the mixture according to the invention.

The term "additive" covers the additives normally used for the manufacture of fused alumina/zirconia grains, especially zirconia stabilizers, and in particular yttrium oxide and titanium oxide. Also included are magnesium oxide, calcium oxide and other oxides of rare earths, in particular neodymium oxide, but also lanthanum, cerium, dysprosium and erbium oxides. The term "additive" also includes mixtures of said species.

The fused alumina/zirconia grains of the mixture according to the invention have a $ZrO_2+HfO_2$ content between 40 and 45.5% so as to promote the formation of eutectic structures.

Preferably, the zirconia of the grains of the mixture according to the invention is predominantly present in its tetragonal allotropic form to the detriment of the monoclinic form.

The term "nodule" refers to a defect of the metallic type (principally Al, Zr, or ZrSi) or of the carbide type (ZrC, AlC) and the size of which does not exceed 10 µm. The nodules are mainly present in the form of substantially spherical and discrete particles (isolated from one another). The nodule concentration is the number of nodules per $mm^2$ of area of a cross section of a grain.

The term "inclusion" refers to a defect of the carbide type, consisting mainly of ZrC, and the size of which is greater than 10 µm. The inclusions are mainly present in an elongate form, consisting of a series or a cluster of carbide particles in contact with one another. The content of grains containing inclusions is the percentage by number of grains containing at least one inclusion.

The "size" of a nodule or of an inclusion is defined by its greatest dimension measured in the plane of observation of a polished section.

The term "primary zirconia" usually refers to any defect of dendritic form, the origin of which is zirconia. The content of grains containing primary zirconia is given by the ratio, expressed as a percentage, of the number of grains having primary zirconia to the total number of grains in question on a polished section.

The term "primary corundum" usually refers to any defect of dendritic or predendritic form of aluminous origin. As shown in FIG. 3, under the microscope primary corundum appears dark gray. The content of grains containing primary corundum is given by the ratio, expressed as a percentage, of the number of grains having primary corundum to the total number of grains in question on a polished section.

Under the microscope, primary zirconia appears light gray, as shown in FIG. 4. The content of grains containing primary zirconia, the content of grains containing primary corundum, the content of grains containing inclusions and the concentration of nodules are preferably determined on a polished section, 25 mm in diameter, of a cylindrical assembly formed by abrasive grains of the mixture having a size between 500 and 600 µm (main slice of grit 36) and embedded in a transparent organic resin.

The grains of the mixture according to the invention may be manufactured by any conventional process for manufacturing fused alumina/zirconia grains, to which a selection final step is added.

A conventional process usually comprises the following steps: mixing with the raw materials, melting in an electric arc furnace, rapid cooling of the molten liquid, milling, and, optionally, classification according to the grit size distribution.

The properties of the mixtures of fused alumina/zirconia grains depend on the thermal behavior of the molten liquid, which itself depends on the process parameters but also strongly on the geometry of the furnace and its environment (flue gas collection, materials, etc.). The values of the process parameters are therefore determined according to the furnace employed, the raw materials used, etc., so as to obtain a mixture of grains according to the invention at the end of these steps. The parameters may for example take the values of the process used for the examples below.

After the last step of conventional processes, the nodule concentration of the grains and the content of grains containing inclusions of the assembly of grains obtained therefore must be measured by sampling. The mixtures of grains that have the features of the mixture according to the invention are then selected.

It is also possible to manufacture a mixture according to the invention by blending various mixtures obtained by means of conventional processes having different parameters.

The effect on the abrasive performance is more pronounced the higher the proportion of grains having a nodule concentration greater than 500 nodules per $mm^2$.

Preferably, this proportion is, as a percentage by number, at least 50%, preferably 80% and more preferably 90%. More preferably, substantially all (at least 99%) of the grains of the mixture have such a nodule concentration. For economic reasons, or for obtaining other advantages, it may therefore be preferable to blend several mixtures until a mixture of grains according to the invention is obtained.

The following nonlimiting examples are given for the purpose of illustrating the invention.

The reference mixture of grains is based on fused alumina/zirconia grains, produced under reducing conditions, sold under the name NZPlus® and described above.

The products given as examples were produced from the following raw materials:
  undercalcined Bayer® alumina with a sodium hydroxide content of less than 0.3%;
  zirconia powder with a zirconia+hafnium content of greater than 98%;
  petroleum coke;
  chips of aluminum metal.

The yttrium oxide, used as additive, was supplied as pure material containing more than 98% yttrium oxide.

The products were prepared according to the conventional process well known to those skilled in the art: mixing of the raw materials; melting in a single-phase electric arc furnace of the Heroult type with graphite electrodes, using a furnace vessel of 0.8 m in diameter, a voltage of 105-150 V, a current of 2200 to 2500 A and a supplied specific electric power of 2.2 to 2.8 kWh/kg of charge. A minimum of 0.5% (up to 3%) of petroleum coke, depending on the state of the furnace, and about 0.5 to 5.5% of aluminum chips were introduced into the charged composition. The molten liquid was then rapidly cooled by means of a device for casting the liquid between thin metal plates, such as that given in patent U.S. Pat. No. 3,993,119. The grains were then milled and classified according to their grit size; grit sizes between grit 12 and grit 220 (FEPA standard), that is to say grains having a size between 45 μm and 2.8 mm, were retained.

The grains obtained were characterized chemically, by X-ray fluorescence. All of the chemical analysis data is given in Table 1. The content of impurities (excluding residual carbon) varies between 0.3 and 0.8%. The balance corresponds to the content of alumina.

Also measured, by visual analysis of the photographs, were the concentration of nodules, the content of grains containing inclusions, the content of grains containing primary zirconia and the content of grains containing primary corundum. The photographs (FIGS. 1 to 4) were obtained using a Reichert® microscope connected to an image analysis station equipped with Visilog® software. The measurements were made on 25-mm-diameter polished sections consisting of abrasive grains embedded in a transparent organic resin, the grains incorporated into the polished sections having a size between 500 and 600 μm.

In the photographs taken in the microscope, the nodules appear as very bright light gray (see FIG. 1).

To evaluate the nodule concentration, the microscope was set to a magnification of ×200. The number of bright white spots with a size of 10 μm or less, symptomatic of the presence of nodules, was then counted. By dividing the number of nodules by the area of the observed region, the number of nodules per $mm^2$ of area of the polished section of a grain was obtained. The calculation was repeated in two other regions of the polished section of the grain. The average of the three measurements gave the nodule concentration for a given specimen.

The inclusions appear very bright light gray in the microscope (see the photograph in FIG. 2).

To evaluate the content of grains containing inclusions, the microscope was set to a magnification of ×50. The number of grains possessing at least one visible inclusion was then counted in the displayed image. The counting was carried out over the entire area of the 25-mm-diameter polished section. A grain was considered to possess an inclusion when at least one bright spot of carbide origin greater than 10 μm was observed in said grain. The content of grains containing inclusions is given by the ratio of the number of grains possessing at least one inclusion to the number of grains counted.

To evaluate the content of grains containing primary corundum, the microscope was set to a magnification of ×100. The number of grains possessing primary corundum dendrites and the number of grains not containing primary corundum was counted until a total of 100 grains of one or other categories had been counted. A grain was considered to possess primary corundum when at least one primary corundum dendrite was observed in said grain. The content of grains containing primary corundum is given by the ratio, expressed as a percentage, of the number of grains possessing primary corundum to the total number of grains counted.

To evaluate the content of grains containing primary zirconia, the microscope was set to a magnification of ×100. The number of grains possessing primary zirconia dendrites and the number of grains not containing primary zirconia was then counted until 100 grains of one or other category had been counted. A grain was considered to possess primary zirconia when at least one primary zirconia dendrite was observed in said grain. The content of grains containing primary zirconia is given by the ratio, expressed as a percentage, of the number of grains possessing primary zirconia to the total number of grains counted.

To demonstrate the mechanical properties of the grains, the tests described below were carried out.

Test A: Determination of the Abrasive Power.

The purpose of test A was to determine the capability of the gains tested to tear material from a steel milling jar.

Prior to the test, the mixture of grains was firstly screened on a vibrating screen of the ROTAP® type, which is standard in the industry, so as to separate the fractions and to isolate the 710/850 µm fraction representing number F24 grain (grit 24) according to the FEPA standard useful for this test.

The distribution fraction underwent a de-ironing operation, using magnetic separation, so as to extract the metallic iron symptomatic of contamination due to the milling. It then was subjected to an oven treatment at 150° C. for 15 minutes followed by cooling in a desiccator. A T100 type AUREC® rotary mill commonly used for milling powders for chemical analysis was used for the test. This mill was mounted on a suspension (6 springs) and a hollow cylindrical jar containing grains to be tested, a pallet and a freely sliding ring were set in motion. The cylindrical milling jar made of steel (Z160 C 12 grade) had the following dimensions: height, 50 mm; inside diameter, 139 mm. The pallet was a solid cylinder (75 mm diameter; 45 mm height) made of steel of Z200C12 grade and weighed 1546 grams. The cylindrical ring (95/120 mm inside/outside diameter; 45 mm height) was made of steel of the same grade (Z200C12) and weighed 1464 grams.

Test A on a Specimen Comprised the Following Steps:

1. the jar was cleaned with compressed air;
2. batch of 25 grams of product to be tested in the grit size distribution slice in question was introduced between the ring and the pallet of the milling jar. The AUREC® mill was turned on, rotating at a nominal speed (1400 rpm) for a period of 150 seconds. The grains were stressed only by the impacts of the pallet and the ring. The powder and the grains were then extracted from the milling jar using a brush (No. 50) in order to analyze the iron content;
3. after milling, the percentage content of iron in the tested specimen was measured. This iron comes from steel torn off by the grains of the mixture during milling. The abrasive power (test A), given as a percentage, corresponds to the ratio of this percentage iron content to the percentage content of iron torn off by the reference mixture of grains. A high value in test A indicates that the grains have a high abrasive power.

Test B: Determination of the Impact Strength

The purpose of test B was to determine the fraction of surviving grains of a given grit size distribution slice, namely 710-850 µm, after being stressed in a steel milling jar—this constitutes a dynamic evaluation of the mechanical strength of the grains.

The specimens for test B were prepared as in the case of test A.

Test B on a Specimen Therefore Comprised the Following Steps:

1. the jar was cleaned with compressed air;
2. a batch of 25 grams of product to be tested in the grit distribution slice in question was introduced between the wall and the pallet of the milling jar. The AUREC® mill was turned on, rotating at a nominal speed (1400 rpm) for a period of 5 seconds. The powder and the grains were then extracted from the milling jar using a brush (No. 50) in order to analyze the grit size distribution. The product was thus screened in a series of 200-mm-diameter screens of a ROTAP® screener for 12 minutes, with the following screens $T_i$.

| | | Screens used (aperture in µm) | |
|---|---|---|---|
| Grit No. | Slice Tested | $T_1$ | $T_2$ |
| 24 | 710/850 µm | 710 | 425 |
| 60 | 300/355 µm | 300 | 250 |
| 100 | 150/180 µm | 180 | 150 |

$T_1+T_2$ refers to the sum of the oversizes, by weight, of the first two screens (for example 710 µm+425 µm in the case of the 710/850 µm slice). The value of the impact strength (test B), given as a percentage, corresponds to the value of $T_1+T_2$ of the specimen tested relative to the value $T_1+T_2$ of the reference specimen. A high value corresponds to a good impact strength of the grain.

It is known to those skilled in the art that the results of tests A and B do not always vary in the same direction. Specifically, in test A, the abrasive power, related to the capability of the grain to be generated, is evaluated. The grain must therefore have a certain "brittleness". In contrast, in step B, the resistance of the grain to macrofracturing is measured. It will be clearly understood that these two measurements may be contradictory. A good grain will therefore be a grain having a good compromise between tests A and B. For this reason, the average value C of the results A and B of the tests A and B has been given in Table 1. The grains are considered to be particularly improved over the grains of the prior art when the factor C is greater than 110% of the reference.

TABLE 1

| Example No. | $ZrO_2$ (wt %) | $Y_2O_3$ (wt %) | C (ppm) | Nodules (no. per mm²) | Inclusions (%) | Primary corundum (%) | Primary zirconia (%) | Stabilized zirconia (%) | A (%) | B (%) | C = (A + B)/2 (%) |
|---|---|---|---|---|---|---|---|---|---|---|---|
| 7970 2 | 42.7 | 0.96 | 550 | 950 | 0.21 | 16 | 41 | 85 | 128.6 | 134.3 | 131.4 |
| 7979 4 | 42.3 | 0.97 | 1900 | 1020 | 1.49 | 31 | 14 | 95 | 119.3 | 140.0 | 129.6 |
| 7980 2 | 45.1 | 0.73 | 1170 | 3220 | 0.21 | 0 | 46 | 95 | 98.6 | 145.7 | 122.1 |
| 8026 2 | 44.5 | 0.93 | 320 | 820 | 0.85 | 2 | 76 | nd | 120.0 | 114.3 | 117.1 |
| 7996 2 | 44.2 | 0.87 | 415 | 690 | 0.64 | 0 | 78 | 85 | 122.9 | 105.7 | 114.3 |
| 8024 5 | 40.2 | 0.89 | 360 | 2240 | 0.00 | 56 | 0 | nd | 105.7 | 122.9 | 114.3 |
| 8026 3 | 44.5 | 0.92 | 300 | 1070 | 1.49 | 0 | 67 | nd | 107.1 | 117.1 | 112.1 |
| 7696 3 | 44.2 | 0.86 | 160 | 340 | 1.49 | 0 | 78 | 83 | 104.3 | 108.6 | 106.4 |
| 7959 2 | 38.9 | 0.81 | 1250 | 1690 | 17.23 | 62 | 0 | 100 | 105.0 | 100.0 | 102.5 |
| 7996 4 | 44.3 | 0.92 | 710 | 310 | 0.21 | 0 | 84 | 77 | 95.0 | 105.7 | 100.4 |
| 8024 2 (Ref.) | 40.2 | 0.93 | 1850 | 3320 | 9.57 | 45 | 0 | nd | 100.0 | 100.0 | 100.0 |
| 7960 6 | 40 | 0.84 | 2800 | 1310 | 5.74 | 73 | 0 | 94 | 85.0 | 111.4 | 98.2 |
| 8027 2 | 44.2 | 0.97 | 650 | 4970 | 29.15 | 0 | 25 | nd | 97.1 | 97.1 | 97.1 |

TABLE 1-continued

| Example No. | ZrO$_2$ (wt %) | Y$_2$O$_3$ (wt %) | C (ppm) | Nodules (no. per mm$^2$) | Inclusions (%) | Primary corundum (%) | Primary zirconia (%) | Stabilized zirconia (%) | A (%) | B (%) | C = (A + B)/2 (%) |
|---|---|---|---|---|---|---|---|---|---|---|---|
| 7983 6 | 43.7 | 0.85 | 880 | 2000 | 22.98 | 0 | 40 | 95 | 93.6 | 100.0 | 96.8 |
| 7959 4 | 38.3 | 0.80 | 600 | 2560 | 18.72 | 51 | 0 | 100 | 85.7 | 105.7 | 95.7 |
| 8025 2 | 38.3 | 0.9 | 590 | 8790 | 11.91 | 32 | 0 | nd | 91.4 | 88.6 | 90.0 |
| 8025 3 | 37.7 | 0.88 | 750 | 7400 | 25.53 | 51 | 0 | nd | 90.7 | 82.9 | 86.8 |
| 8012 2 | 37.7 | 0.68 | 10800 | 5590 | 85.11 | 100 | 0 | nd | 74.3 | 77.1 | 75.7 |

In Table 1: "nd" means "not determined".

If the data of Table 1 are classified in terms of abrasive power (test A), it is apparent that a nodule concentration between 690 and 2240 nodules per mm$^2$ is particularly advantageous for favoring this criterion. Preferably, the nodule concentration is greater than 500, preferably greater than 600 and more preferably greater than 900 nodules per mm$^2$ and less than 2500, preferably less than 1500 nodules per mm$^2$. The content of grains of the mixture containing inclusions is preferably less than 1.5%.

If the data of Table 1 are classified as a function of the impact strength (test B), it is apparent that a high nodule concentration is particularly advantageous for favoring this criterion, provided that the content of grains containing inclusions remains less than 2%. Preferably, to favor the impact strength, the nodule concentration is greater than 950 nodules per mm$^2$, preferably greater than 1000 nodules per mm$^2$.

The tests described above show that the performance of the grit may be connected with its structure. It is observed that a low content of grains containing inclusions associated with a defined nodule concentration (preferably between 600 and 3500 per mm$^2$) makes it possible to obtain mixtures of grains having improved characteristics.

Most particularly preferred are grains having a percentage of zirconia between 42 and 44% as this favors the formation of a structure close to the pure eutectic. It is also preferable for the content of grains containing primary corundum of the mixture to be between 0 and 20% and for the content of grains containing primary zirconia of the mixture to be greater than 20% and preferably between 30 and 80% and even more preferably between 30 and 50%.

Without wishing to be tied down by any theoretical argument, it is probable that the presence of nodules allows the scale of fracturing to be reduced since each abrasive grain consists of eutectic cells oriented along the growth front of the Al$_2$O$_3$/ZrO$_2$ eutectic (called a "colony" morphology) and separated by grain boundaries, more specifically called "cell boundaries". The presence of microdefects, such as nodules inside the eutectic cells, means that the fracturing no longer preferably takes place at the cell boundaries but preferentially within the actual eutectic cells. The surface irregularities of the grit are thus finer, the grains microfracturing regularly at lower force scales. This makes it possible to improve their abrasive power by continuous regeneration of their cutting edges, while limiting their wear by attrition.

Of course, the present invention is not limited to the embodiments described and shown are provided as nonlimiting illustrative examples.

The invention claimed is:

1. A mixture of fused alumina/zirconia grains having the following chemical composition, in percentages by weight and for a total of 100%:

| | |
|---|---|
| ZrO$_2$ + HfO$_2$: | 40-45.5% |
| Al$_2$O$_3$: | 46-58% |
| Additive: | 0-10% |
| SiO$_2$: | <0.8% |
| Impurities: | <1.2%, | wherein the mixture comprises less than 2% of grains containing inclusions and the grains have a nodule concentration, measured on a cross section of any grain of said mixture, greater than 500 nodules per mm$^2$ in at least 50% of the grains, said nodule being a defect of a metallic defect or of a carbide defect.

2. The mixture as claimed in claim 1, wherein the nodule concentration is greater than 500 nodules per mm$^2$ in at least 90% of the grains.

3. The mixture as claimed in claim 1, wherein said nodule concentration is greater than 900 nodules per mm$^2$.

4. The mixture as claimed in claim 1, wherein said nodule concentration is greater than 2000 nodules per mm$^2$.

5. The mixture as claimed in claim 1, wherein the mixture comprises less than or equal to 1.5% of grains containing inclusions.

6. The mixture as claimed in claim 1, wherein said additive is selected from the group consisting of yttrium oxide, titanium oxide, magnesium oxide, calcium oxide, neodymium oxide, lanthanum oxide, cerium oxide, dysprosium oxide and erbium oxide, and any other compound of the family of rare earths, or a mixture thereof.

7. The mixture as claimed in claim 1, comprising, in percentages by weight:

| | |
|---|---|
| Y$_2$O$_3$: | 0.1-1.2% and/or |
| TiO$_2$: | 0.1-3% and/or |
| SiO$_2$: | <0.4% and/or |
| ZrO$_2$ + HfO$_2$: | 42-44%. |

8. The mixture as claimed in claim 1, wherein the mixture comprises grains containing primary zirconia in a range between 20% and 45%.

9. The mixture as claimed in claim 1, wherein the mixture comprises grains containing primary corundum in a range between 0% and 20%.

10. The mixture as claimed in claim 1, wherein the grains of said mixture form a subassembly having a size between 500 μm and 600 μm, and the mixture comprises less than 2% of grains containing inclusions and/or between 20% and 45% of grains containing primary zirconia and/or between 0% and 20% of grains containing primary corundum.

11. The mixture as claimed in claim 1, wherein said grains have a size, according to the FEPA standard, between grit 12 and grit 220, or between 45 μm and 2.8 mm.

12. An abrasive tool comprising a mixture of fused alumina/zirconia grains in accordance with claim 1, bonded by a binder or deposited as a layer on a flexible support and retained by a binder.

13. A process for manufacturing a mixture of grains, comprising the following successive steps:

a) mixing of raw materials to form a starting charge comprising 0.5% to 5.5% of aluminum chips, and a minimum of 0.5% of petroleum coke;

b) melting of said mixed raw materials until a molten liquid is obtained in conditions corresponding to a melting in a single-phase electric arc furnace of Heroult type with graphite electrodes, using a voltage of 105-150 V, a current of 2,200 to 2,500 A and a supplied specific electric power of 2.2 to 2.8 kWh/kg of charge;

c) cooling of said molten liquid by quenching the liquid until a solid mass is obtained;

d) milling of said solid mass so as to obtain a mixture of grains and, optionally, grit size classification of said mixture, said raw materials being chosen so that the grains of said mixture have a chemical composition in percentages by weight of:

| | |
|---|---|
| $ZrO_2 + HfO_2$: | 40-45.5% |
| $Al_2O_3$: | 46-58% |
| Additive: | 0-10% |
| $SiO_2$: | <0.8% |
| Impurities: | <1.2%, | and e) selecting of the milled grains to obtain a mixture of grains according to claim 1.

14. The mixture as claimed in claim 1, obtained from a process comprising a step of melting a starting charge comprising 0.5% to 5.5% of aluminum chips.

15. The mixture as claimed in claim 14, wherein the starting charge further comprises a minimum of 0.5% of petroleum coke.

* * * * *